United States Patent [19]
Dunne et al.

[11] 3,946,393
[45] Mar. 23, 1976

[54] TRANSPONDER FOR USE IN A RADIO FREQUENCY COMMUNICATION SYSTEM
[75] Inventors: Thomas P. Dunne, Acton; Richard D. Ruggiero, Woburn, both of Mass.
[73] Assignee: Raytheon Company, Lexington, Mass.
[22] Filed: Jan. 24, 1974
[21] Appl. No.: 436,254

[52] U.S. Cl. .................... 343/6.8 R; 325/11; 325/65
[51] Int. Cl.² ........................................... G01S 9/56
[58] Field of Search .......... 343/6.8 R, 6.5 R; 325/9, 325/11, 65

[56] References Cited
UNITED STATES PATENTS

| | | | |
|---|---|---|---|
| 2,820,138 | 1/1958 | Haard | 325/65 X |
| 3,019,296 | 1/1962 | Schelleng | 325/65 X |
| 3,383,618 | 5/1968 | Engelbrecht | 325/65 X |
| 3,605,018 | 9/1971 | Coviello | 325/65 |
| 3,611,145 | 10/1971 | O'Connor | 325/65 |
| 3,684,962 | 8/1972 | Hottel | 343/6.5 R X |

*Primary Examiner*—T. H. Tubbesing
*Attorney, Agent, or Firm*—Richard M. Sharkansky; Philip J. McFarland; Joseph D. Pannone

[57] ABSTRACT

A transponder for use in a radio frequency communication system is disclosed wherein a received radio frequency signal is converted into an intermediate frequency signal, the latter signal being distorted by a nonlinear network to produce a composite signal having an "intermodulation signal" portion and a "primary signal" portion, such portions having a 180° phase shift therebetween. The distorted signal is converted to a correspondingly distorted radio frequency signal, the latter signal being amplified by a radio frequency amplifier. Intermodulation in the primary signal portion of the distorted radio frequency signal resulting from operation of the radio frequency amplifier in its nonlinear region is reduced by the 180° out-of-phase intermodulation signal portion of the distorted radio frequency signal. Such arrangement enables the radio frequency amplifier to operate with maximum amplification and efficiency.

4 Claims, 9 Drawing Figures

TRANSPONDER FOR USE IN A RADIO FREQUENCY COMMUNICATION SYSTEM

The invention herein described was made in the course of, or under, a contract or subcontract thereunder, with the Department of Defense.

BACKGROUND OF THE INVENTION

This invention pertains generally to radio frequency communication systems, and more particularly to transponders for use in such systems.

As is known in the art, it is sometimes desired to use, in radio frequency communication systems, transponders to amplify and then retransmit received radio frequency signals. Such transponders generally include a radio frequency amplifier, such as a traveling wave tube (TWT), to provide the desired amplification. In order to retransmit a received radio frequency signal it is generally desirable for the transponder to perform linearly over its bandwidth. For example, if the radio frequency amplifier is operated in a nonlinear region near saturation, a distorted version of the received signal would be retransmitted. One type of distortion which results from such operation is intermodulation distortion. For example, if a transponder is used in a radio communication system to relay, simultaneously, at least two signals, each having a different frequency, such signals will intermodulate with each other when the amplifier is operated in its nonlinear region near saturation, thereby producing "cross talk" between the signals. In another application, as in a missile application, a missile carries the transponder to relay target reflected radio frequency energy to a ground station. In addition to target reflected radio frequency energy, however, reflections from clutter are also received by the transponder. Therefore, by operating the radio frequency amplifier in its nonlinear region near saturation intermodulation between the clutter reflections may produce frequency components at the frequency associated target reflections. The "signal-to-noise" ratio of the retransmitted radio frequency signal is therefore reduced relative to the signal-to-noise ratio of the received radio frequency signal.

In radio communication systems wherein a satellite includes a transponder, or in the above described missile application, it is highly desirable that the transponder be compact, lightweight and require minimum operating power. Therefore, in view of the foregoing, it follows that the linearity of a radio frequency amplifier used therein be optimized over the bandwidth of the transponder. The radio frequency amplifier used in such applications must, generally, then be operated about 10 db below the level where saturation of such amplifier begins in order to insure the requisite operating linearity. Generally, however, radio frequency amplifiers operate with 10–25 percent efficiency in the nonlinear region near saturation and consequently by requiring such amplifier to operate 10 db below saturation the efficiency of such amplifiers reduces to about an efficiency of 1 to 3 percent.

SUMMARY OF THE INVENTION

With this background of the invention in mind it is therefore an object of this invention to provide an improved transponder for use in a radio frequency communication system.

It is a further object of this invention to optimize the linearity of the transponder over the operating bandwidth thereof.

These and other objects of the invention are attained generally by including: Means for converting a received radio frequency signal to an intermediate frequency signal; means for distorting such intermediate frequency signal; means for converting such distorted signal to a radio frequency signal; a radio frequency amplifier adapted to operate in its nonlinear region near saturation to amplify and to redistort such converted radio frequency signal so that the resulting radio frequency signal is an amplified, but a substantially undistorted, replica of the received radio frequency signal.

BRIEF DESCRIPTION OF THE DRAWINGS

The above-mentioned and other features of the invention will be more apparent by reference to the following description taken together in conjunction with the accompanying drawings, in which.

DESCRIPTION OF THE PREFERRED EMBODIMENTS

Figure 1:
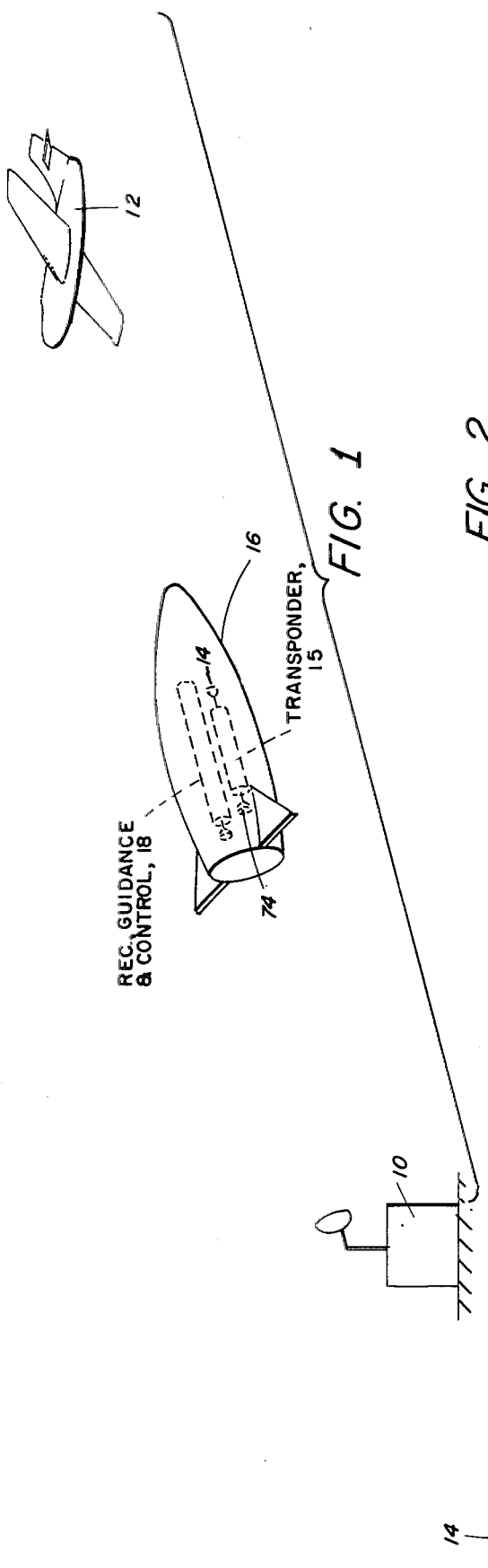
FIG. 1 is a sketch, not in perspective, of a missile system incorporating the features of the invention.

Referring now to FIG. 1, a missile system is shown to include a radar ground station 10 for transmitting and directing radio frequency energy towards a target 12. A portion of such radio frequency energy is reflected by target 12 and received by a monopulse antenna 14 of a transponder 15 contained within missile 16. It is here noted that such antenna 14 also receives radio frequency signals reflected from clutter, not shown. It follows, then, that the received radio frequency energy is comprised of a spectrum of frequencies resulting from both target reflections and clutter reflections. Such radio frequency signals are then amplified in the transponder 15, the details of which will be described, and retransmitted to the ground station 10. Then such retransmitted signals are processed by digital processing equipment, not shown, housed within the radar ground station 10. Such digital processing equipment is used to generate appropriate guidance command signals for enabling the missile 16 to be guided successfully to intercept the target 12. Such generated guidance command signals are transmitted to the missile 16 by suitable radio means, not shown, also housed within ground station 10. The missile 16 receives and processes such guidance command signals by means of a conventional receiver and guidance processor 18 carried on board such missile.

Figure 2:
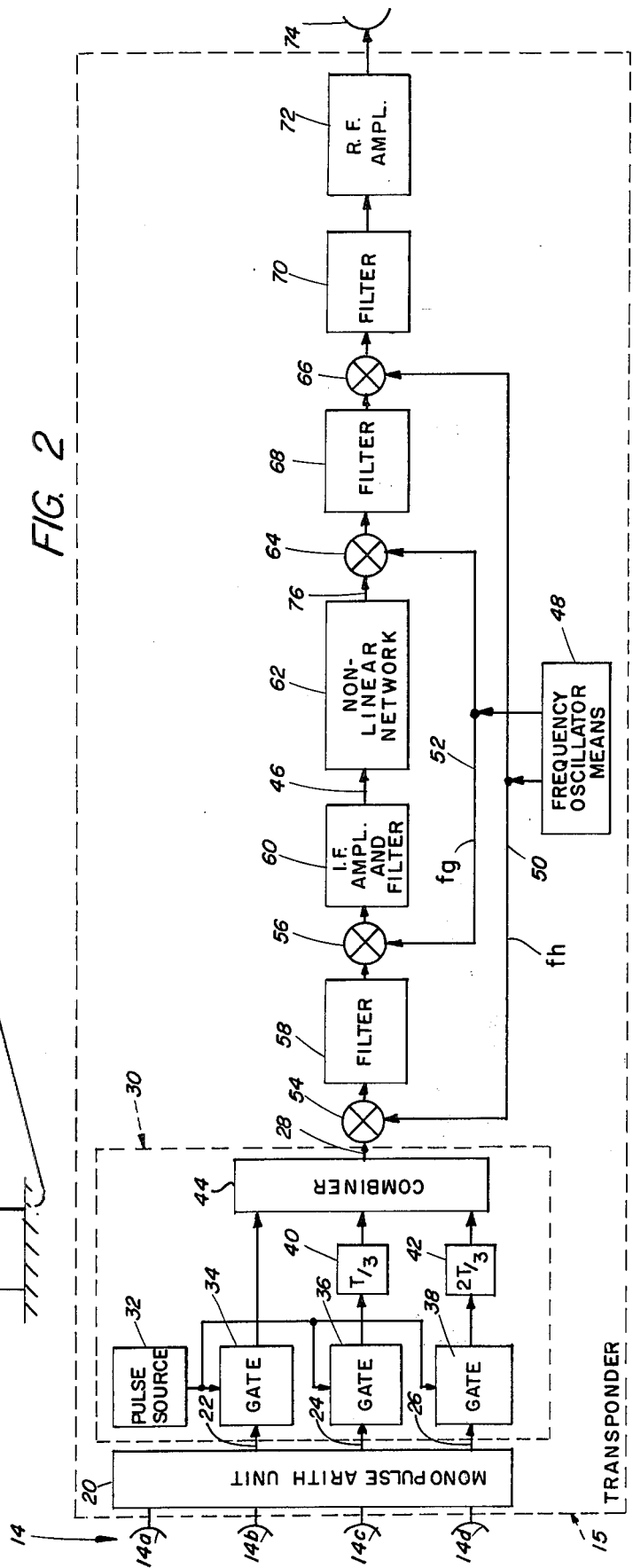
FIG. 2 is a block diagram of a transponder used in the missile system.

Referring now to FIG. 2, transponder 15 is shown to include a conventional monopulse arithmetic unit 20 fed by four conventional antenna elements 14a to 14d. Such antenna elements 14a – 14d comprise a conventional monopulse antenna 14 to produce a "sum" signal on line 22 and a pair of "difference" signals on lines 24, 26, respectively. The signals on lines 22, 24 and 26 are time multiplexed into a single line 28 by multiplexer 30. Multiplexer 30 includes a pulse generator 32 for generating a train of pulses, here having a period T sec. and a pulse width T/3 sec. Gates 34, 36, 38 are coupled to a different one of the lines 22, 24, 26 as shown. Such gates 34, 36, 38 are here any suitable radio frequency switches responsive to the pulse applied thereto, to pass radio frequency signals fed thereto during the time duration of such pulse. The train of pulses generated by pulse generator 32 is applied to gates 34, 36, 38 substantially simultaneously. The output of gate 34 is applied directly to combiner 44. Combiner 44 is a summer comprised of conventionally arranged hybrid junctions. The output of gate 36 is applied to combiner 44 through a delay network 40. Such delay network 40 delays the signal gated through gate 36 for T/3 seconds. The output of gate 38 is applied to combiner 44 through a delay network 42, such network being identical to the delay network 40, however, having a delay 2T/3 secs. It follows, then, that the output of delay network 42 delays the signal gated through gate 38 for 2T/3 secs. Therefore, the signal at the output of summer 44 (on line 28) appears as a train of radio frequency pulses, the first one thereof representing the sum signal, the next succeeding one thereof representing one of the difference signals and the third consecutive one thereof representing the other one of the difference signals. The train of radio frequency signals on line 28 is downconverted in frequency to a corresponding train of intermediate frequency signals. Such downconverted signals appear on line 46. Such down conversion is provided by conventional mixers 54, 56, filter 58 and IF amplifier and filter 60 arranged to form a conventional heterodyning network. A suitable intermediate frequency oscillator means 48 is used to provide a signal of frequency $f_h$ on line 50 and a signal of $f_g$ on line 52. The signals on line 46 are fed to a nonlinear network 62, the details of which will be described hereinafter. Suffice it to say here that such network 62 is adapted to adjust the gain and phase of the intermediate frequency signals applied thereto as a nonlinear function of the amplitude of such signals. The intermediate frequency signals developed at the output of nonlinear network 62 are upconverted in frequency to a radio frequency signal by means of a conventional heterodyning arrangement made up of mixers 64, 66, filters 68, 70 and frequency oscillator means 48. The upconverted radio frequency signal is amplified by a radio frequency amplifier 72, here a traveling wave tube, and retransmitted to radar ground station 10 by antenna 74.

Figure 3A:
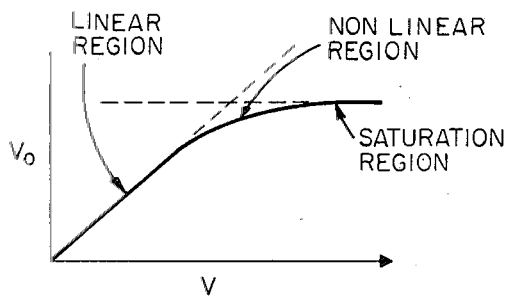
FIGS. 3A and 3B are curves showing the gain and phase characteristics of a radio frequency amplifier used in the transponder.
Figure 3B:
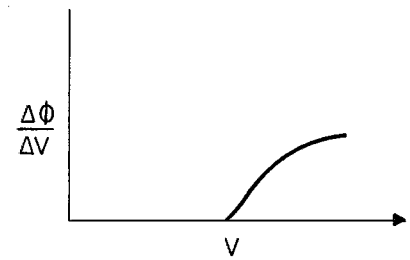

The gain and phase characteristics of radio frequency amplifier 72 are shown as solid curves in FIGS. 3A and 3B, respectively. FIG. 3A shows the nonlinear gain relationship of the radio frequency amplifier 72 (as indicated by the solid curve) to be comprised of three regions: A linear region; a nonlinear region; and, a saturation region. As is known, an amplifier having such nonlinear gain relationship may be described by a Taylor series expansion of the form:

$$V_o = a + bV + cV^2 + dV^3 + eV^4 + fV^5 + \cdots$$

where: $a, b, c, d, e, f \ldots$ are constants;

$V_o$ is the output voltage of such amplifier; and, $V$ is the input voltage to such amplifier.

Therefore, assuming $V$ is comprised of at least two frequency components, intermodulation between such components will result when the amplifier operates in its nonlinear region. This is sometimes referred to as AM — AM (i.e., amplitude modulation to amplitude modulation) intermodulation. The more signficant intermodulations are associated with the odd power terms (i.e., $dV^3$, $fV^5 \ldots$ ) because the resulting frequency components fall within the bandpass of the transponder. The most significant intermodulation component is $dV^3$ because the energy in such component is generally greater than the energy in the other odd power terms. FIG. 3B shows the nonlinear relationship between an incremental change in phase shift ($\Delta\phi$) per incremental change in input voltage level ($\Delta V$) as a function of the input voltage ($V$) to the amplifier. When the amplifier operates in the linear region, $\Delta\phi/\Delta V$ is to generate intermodulation. Such intermodulation is generally referred to as AM to PM (i.e., amplitude modulation to phase modulation) intermodulation.

Let it be assumed, for example, that the signal applied to the radio frequency amplifier 72 is a composite signal comprised of a signal of frequency $f_1$ and a signal of frequency $f_2$. Further, let it be assumed that the amplitude of such composite signal causes the amplifier 72 to operate in its nonlinear region near saturation, (i.e., near its point of maximum output power). Because of the nonlinear gain and phase relationship of the radio frequency amplifier, intermodulation (i.e., distortion) will be produced between the frequency components comprising the signal applied to the radio frequency amplifier 72. Further, the signal developed at the output of such radio frequency amplifier 72 (i.e., the retransmitted signal) will be a radio frequency signal having at least four components: One component being a signal of frequency $f_1$; another having a frequency $f_2$; a third having a frequency $2f_1 - f_2$ and a fourth having a frequency $2f_2 - f_1$, these last two components generally being referred to as the "third-order" intermodulation frequencies.

Figure 4:
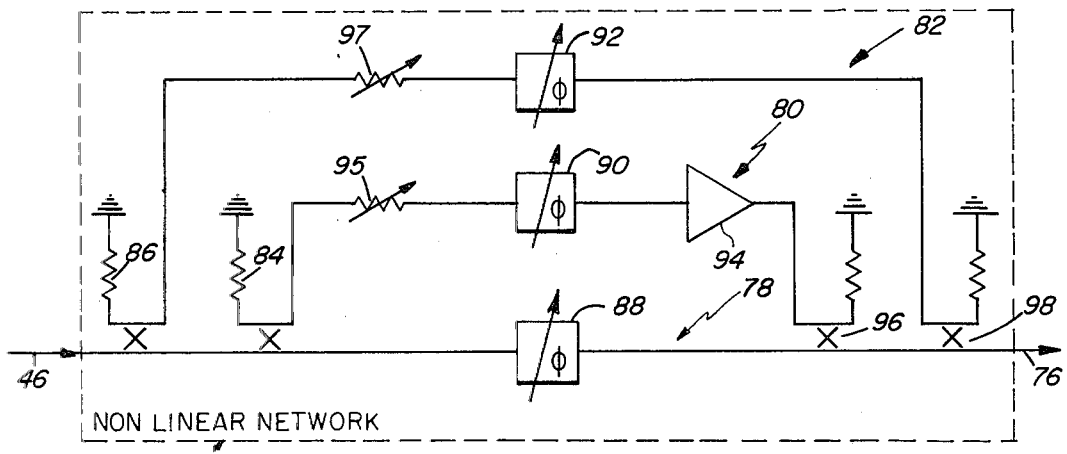
FIG. 4 is a block diagram of a nonlinear network used in the transponder.

Referring again to FIG. 2, nonlinear network 62 is provided to compensate for the intermodulation distortion just mentioned (in particular the third-order intermodulation frequency) which results from operating the radio frequency amplifier 72 in its nonlinear region near saturation. Referring to FIG. 4, the details of such nonlinear network 46 are shown. Nonlinear network 62 couples the train of intermediate frequency signals on line 46 to an output line 76 through a plurality, here three, of paths 78, 80, 82. Portions of the signal on line 46 are coupled to the paths 80, 82 by means of directional couplers 84, 86 respectively as shown. Disposed in paths 78, 80 and 82 are phase shifters 88, 90, 92 respectively as shown. Disposed in path 80 is an amplifier 94 and an adjustable attenuator 95. Disposed in path 82 is an adjustable attenuator 97. The nonlinear gain characteristics of such amplifier are designed to be equivalent to the nonlinear gain characteristics of the radio frequency amplifier. The signals in paths 80 and 82, after passing through the elements disposed therein, are recoupled to the signal exiting path 78 by means of directional couplers 96, 98 respectively as shown, to form a composite intermediate frequency signal on line 78. Let it first be assumed that the signal applied to the nonlinear network 62 on line 46 is an intermediate frequency signal comprised of two frequency components, $f_1'$ and $f_2'$. Let it next be assumed that the level of the signal passing through path 80 through amplifier 94 causes such amplifier to operate in its nonlinear region near saturation. It follows, then, that intermodulation will result between each one of the components comprising the intermediate frequency signal passing through path 80 in a way similar to the intermodulation produced by operation of the radio frequency amplifier 72 in its nonlinear region near saturation. Consequently, the signal developed on line 76 will be a composite signal including a primary signal portion having frequency components of frequency $f_1'$, of frequency $f_2'$ and intermodulation signal portion comprising frequencies $2f_2'-f_1'$ and $2f_1'-f_2'$ (i.e., the third-order intermodulation frequencies). Because the upconversion of the intermediate frequency signal produce at the output of nonlinear network 62 to a radio frequency signal is a linear process, the intermediate frequency components comprising the signal on line 76 become linearly translated to radio frequency signals applied to radio frequency amplifier 72. To put it another way, while nonlinear network 62 distorts the intermediate frequency signals applied thereto in a way to produce the third-order intermodulation frequency components, the resulting intermediate frequency signal becomes linearly translated in frequency by the frequency upper conversion to a correspondingly distorted radio frequency signal. By operating radio frequency amplifier 74 in the nonlinear region near saturation, the up-converted and distorted radio frequency signal applied to such radio frequency amplifier 72 becomes redistorted by such radio frequency amplifier for the reasons mentioned above. By properly adjusting the phase of the intermediate frequency intermodulation signals passing through path 80 so the intermodulation signal portion of the intermediate frequency signal is 180° out-of-phase with the primary signal portion passing through paths 82 and 78, and further by adjusting the gain of the signals passing through paths 80, 82 and 78, the intermodulation produced by such nonlinear network 62 will reduce the intermodulation produced by the nonlinear characteristics of radio frequency amplifier 72. In the example referred to above, the signal produced by the nonlinear network on line 76 may be considered as comprised of frequencies $f_1'$, $f_2'$, $2f_1'-f_2'$, $2f_2'-f_1'$. The up-conversion of such frequencies produces a radio frequency signal comprised of frequencies $$f_1' + (f_h+f_o) = f_1$$

$$f_2' + (f_h+f_o) = f_2$$

$$2f_1'-f_2' + (f_h=f_o) = f_3$$

$$2f_2'-f_1 + (f_h+f_o) = f_4$$

By applying such up-converted signal to the radio frequency amplifier 72, and by operating such amplifier in its nonlinear region near saturation, intermodulation distortion will produce, at the output of such amplifier, a radio frequency signal having at least the following frequency components:
$f_1, f_2, 2f_1-f_2, f_3, f_4, 2f_2-f_1$ However, $2f_1-f_2 = f_3$ and $2f_2-f_1 = f_4$. Therefore, the intermodulation components $2f_1-f_2$ and $2f_2-f_1$ produced by the third-order intermodulation between frequencies $f_1$ and $f_2$ within the radio frequency amplifier 72 will be reduced by the 180° out-of-phase frequency components $f_3$ and $f_4$ produced within the nonlinear network.

Figure 5A:
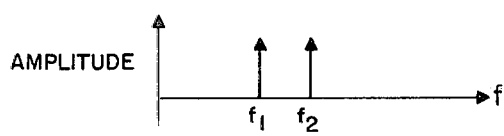
FIGS. 5A to 5D are curves useful in understanding the nonlinear network.
Figure 5B:
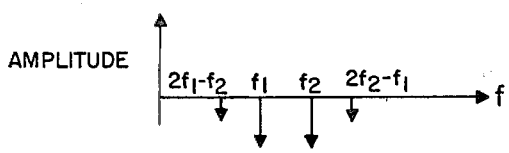
Figure 5C:
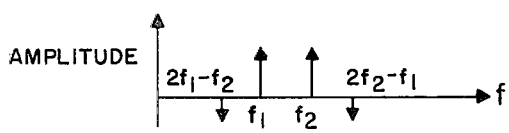
Figure 5D:
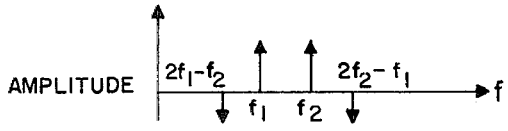

In order to more clearly understand the adjustments required for the nonlinear network 62 reference is made to FIGS. 4 and 5A – 5D. FIG. 5A shows the frequency spectrum of the signal applied to line 46 under the above-mentioned assumptions. As shown, such signal includes a frequency $f_1$ and a frequency $f_2$. The frequency spectrum of the signal produced at the output of path 80 is shown in FIG. 5B to include frequencies $f_1, f_2, 2f_1-f_2, 2f_1-f_1$. Attenuator 95 and delay lines 90, 88 are adjusted so that the signal produced at the output of coupler 96 has frequency components $f_1$ and $f_2$ 180° out-of-phase with intermodultion frequency components $2f_1-f_2$ and $2f_2-f_1$ as shown in FIG. 5C and also such that the intermodulation frequency components are sufficient to provide the desired reduction in intermodulation produced by the radio frequency amplifier 72. Attenuator 97 is adjusted to enable proper contribution of the energy at frequencies $f_1$ and $f_2$. The frequency spectrum of the signal produced at the output of nonlinear network 62 (on line 76) then may be represented as shown in FIG. 5D.

Having described a preferred embodiment of this invention, it is evident that other embodiments incorporating its concepts may be used. For example, the conversion to the intermediate frequency signal may be done prior to the multiplexing of the sum and pair of difference signals. It is felt, therefore, that this invention should not be restricted to its disclosed embodiments, but rather should be limited only by the spirit and scope of the appended claims.

What is claimed is:

1. In a radio frequency transponder wherein a received radio frequency signal is linearily amplified and then retransmitted as a radio frequency signal, the improvement comprising:
   a. first heterodyning means, responsive to the received radio frequency signal, for converting such signal to a corresponding intermediate frequency signal;
   b. means, responsive to the amplitude of the intermediate frequency signal, for distorting such intermediate frequency signal in accordance with the amplitude of the intermediate frequency signal;
   c. second heterodyning means, for converting such distorted intermediate frequency signal to a distorted radio frequency signal; and,
   d. a nonlinear radio frequency amplifier, fed by the second heterodyning means, adapted to operate in its nonlinear region near saturation to amplify and redistort such distorted radio frequency signal into the linearily amplified and retransmitted radio frequency signal, the characteristics of the distorting means being related to the nonlinear characteristics of the nonlinear radio frequency amplifier.

2. The improvement recited in claim 1 wherein the distorting means includes a nonlinear network, such network producing a composite signal having an intermodulation signal portion and a primary signal portion, each such portion having a 180° phase shift portion.

3. The improvement recited in claim 2 wherein the nonlinear network includes means for coupling the radio frequency signal applied thereto to an output thereof through a plurality of paths, one such path including a nonlinear element having a nonlinear characteristic related to the nonlinear characteristics of the radio frequency amplifier.

4. The improvement recited in claim 3 comprising:
   a. a plurality of antenna elements for receiving the radio frequency signals;
   b. means, coupled to the antenna elements, for multiplexing the signals received by each one of the antenna elements to form a single signal; and
   c. means for feeding such single signal to the distorting means.

* * * * *